(12) United States Patent
Nishimura et al.

(10) Patent No.: US 10,175,390 B2
(45) Date of Patent: Jan. 8, 2019

(54) FACE PROTECTIVE OPTICAL ELEMENT

(71) Applicant: DEXERIALS CORPORATION, Tokyo (JP)

(72) Inventors: Kimitaka Nishimura, Miyagi-gun (JP); Toru Abiko, Sendai (JP); Shinichi Matsumura, Miyagi-gun (JP)

(73) Assignee: DEXERIALS CORPORATION, Tokyo (JP)

( * ) Notice: Subject to any disclaimer, the term of this patent is extended or adjusted under 35 U.S.C. 154(b) by 0 days.

(21) Appl. No.: 14/649,063

(22) PCT Filed: Jan. 16, 2014

(86) PCT No.: PCT/JP2014/050675
§ 371 (c)(1),
(2) Date: Jun. 2, 2015

(87) PCT Pub. No.: WO2014/112555
PCT Pub. Date: Jul. 24, 2014

(65) Prior Publication Data
US 2015/0323704 A1      Nov. 12, 2015

(30) Foreign Application Priority Data

Jan. 17, 2013   (JP) .................................. 2013-005826
Nov. 13, 2013   (JP) .................................. 2013-235219

(51) Int. Cl.
*G02B 1/11*      (2015.01)
*A41D 13/11*     (2006.01)
(Continued)

(52) U.S. Cl.
CPC ............ *G02B 1/11* (2013.01); *A41D 13/1184* (2013.01); *B32B 3/30* (2013.01); *B32B 27/06* (2013.01);
(Continued)

(58) Field of Classification Search
CPC ........ G02B 1/11; G02B 1/118; G02B 5/0278; G02B 5/0242; G02B 27/00; B32B 27/16;
(Continued)

(56) References Cited

U.S. PATENT DOCUMENTS

| | | |
|---|---|---|
| 6,026,511 A | 2/2000 | Baumann et al. |
| 2010/0290118 A1 | 11/2010 | Yamada |

(Continued)

FOREIGN PATENT DOCUMENTS

| | | |
|---|---|---|
| EP | 1837685 A1 | 9/2007 |
| JP | H07-178117 A | 7/1995 |

(Continued)

OTHER PUBLICATIONS

Aug. 6, 2015 International Preliminary Report on Patentability issued in International Patent Application No. PCT/JP2014/050675.

(Continued)

*Primary Examiner* — Jie Lei
(74) *Attorney, Agent, or Firm* — Oliff PLC

(57) ABSTRACT

An optical element is provided which reflects a reduced amount of light even under a very high intensity lighting system used for a surgical operation, a dental treatment etc., has anti-fogging performance, and is transparent and useful for face protection. The optical element has a flexible transparent substrate and a plurality of structures disposed on opposite surfaces of the substrate at a pitch equal to or less than the wavelength of visible light. The structures are formed from a cured product of a resin having a hydrophilic functional group.

9 Claims, 11 Drawing Sheets

(51) Int. Cl.
  *G02B 1/118* (2015.01)
  *B32B 27/06* (2006.01)
  *B32B 27/16* (2006.01)
  *B32B 3/30* (2006.01)

(52) U.S. Cl.
  CPC .............. *B32B 27/16* (2013.01); *G02B 1/118* (2013.01); *B32B 2250/40* (2013.01); *B32B 2307/418* (2013.01); *B32B 2307/728* (2013.01); *B32B 2551/00* (2013.01)

(58) Field of Classification Search
  CPC ....... B32B 27/06; B32B 3/30; B32B 2551/00; B32B 2250/40; B32B 2307/418; B32B 2307/728; G02F 1/1335; G02F 1/13; A41D 13/11; A41D 13/1184; A41D 13/1115; B60R 1/088; B60R 1/086; A62B 18/02; A62B 18/082
  USPC .......... 359/601, 603, 605, 609, 599; 2/9, 15; 128/201.15, 201.17, 205.25, 206.12, 128/206.23
  See application file for complete search history.

(56) References Cited

U.S. PATENT DOCUMENTS

2011/0002041 A1   1/2011   Tazawa
2012/0243097 A1   9/2012   Hayashibe et al.
2014/0098422 A1   4/2014   Fukuda et al.

FOREIGN PATENT DOCUMENTS

| | | |
|---|---|---|
| JP | 2001-525203 A | 12/2001 |
| JP | 2008-158293 A | 7/2008 |
| JP | 2010-202881 A | 9/2010 |
| JP | 2011-028229 A | 2/2011 |
| JP | 2011-053334 A | 3/2011 |
| JP | 2012-203018 A | 10/2012 |
| JP | 2013-001007 A | 1/2013 |
| JP | 2013-007905 A | 1/2013 |
| WO | 2010/073881 A1 | 7/2010 |
| WO | 2011/118367 A1 | 9/2011 |
| WO | 2012/133946 A1 | 10/2012 |

OTHER PUBLICATIONS

Jul. 21, 2016 Search Report issued in European Patent Application No. 14740950.2.

Apr. 15, 2014 International Search Report issued in International Patent Application No. PCT/JP2014/050675.

May 2, 2017 Office Action issued in Japanese Patent Application No. 2013-235219.

Mar. 12, 2018 Office Action issued in European Patent Application No. 14740950.2.

Nov. 28, 2017 Decision of Refusal issued in Japanese Patent Application No. 2013-235219.

A

B

C (B-B CROSS SECTION)

(A-A CROSS SECTION)

FACE PROTECTIVE OPTICAL ELEMENT

TECHNICAL FIELD

The present technique relates to a face protective optical element that can ensure the necessary field of view while the face is protected from an object flying toward the face, and in particular, to a face protective optical element with improved visible light transmittance.

BACKGROUND ART

A conventional face shield used for a surgical operation etc. has a structure in which a transparent plastic film serving as an eye shield is attached to a face mask (Patent Literature 1).

Generally, a flexible transparent plastic film, however, has a refractive index of 1.3 or more, and light reflection occurs at the interface with air. For example, polyethylene terephthalate described in Patent Literature 1 has a refractive index of 1.58, and the reflectance at the interface with air is 5.05%. In consideration of reflection on the front and rear sides of the film, the ratio of the reflected light generated is as much as 10.1%. In an operating room in which a surgical operation is performed, a surgical lighting system with very high intensity is used. The illuminance of such a lighting system is 140,000 lx or more, and the intensity of reflected light is also high.

In one proposal for such a surgical lighting system with high intensity, a surface of a transparent or semi-transparent substrate is coated with a composition for imparting anti-reflective and anti-fogging properties (Patent Literature 2).

Patent Literature 2 shows that the film coated with the composition that is described in the Patent Literature and imparts the anti-reflective and anti-fogging properties has a light transmittance higher by 11 to 11.2% than that of an uncoated film. However, the transmittance of the coated film at 550 nm is 97.0%, and the ratio of the reflected light generated is still about 3%. This is a cause of glare during use.

CITATION LIST

Patent Literature

Patent Literature 1: Japanese Patent Application Laid-Open No. Hei. 7-178117
Patent Literature 2: Japanese Patent Application Laid-Open No. 2010-202881

SUMMARY OF INVENTION

Technical Problem

An object of the present invention is to provide an optical element that reflects a reduced amount of light even under a very high intensity lighting system such as a lighting system used in a surgical operation room, has anti-fogging performance, and is transparent and useful for face protection and to provide a face protector using the optical element.

Solution to Problem

A first technique to solve the above problems is a face protective optical element including a flexible transparent substrate having, on opposite surfaces thereof, a plurality of structures disposed at a pitch equal to or less than a wavelength of visible light.

A second technique is a face protector including the above-described optical element that is detachably attached to a jig or is secured to a face mask.

Advantageous Effects of Invention

In the optical element of the present invention, a plurality of structures are disposed on the opposite surfaces of the transparent substrate at a pitch equal to or less than the wavelength of visible light. Therefore, the present invention can provide a face protective transparent optical member that reflects a reduced amount of light even under a lighting system with very high intensity.

Since the surfaces of the optical element of the present invention are hydrophilic, water contained in breath immediately spreads evenly, so that fogging is prevented. Therefore, the present invention can provide a face protective optical member that resists fogging and has high transmittance.

Therefore, the face protector using the optical element of the present invention can provide an environment free of poor visibility caused by fogging or glare by reflected light in a face protection application for a surgical operation, a dental treatment, etc. in which objects flying toward the face are generated.

BRIEF DESCRIPTION OF DRAWINGS

in FIG. 5B.

DESCRIPTION OF EMBODIMENTS

Embodiments of the present invention will be described in detail.

[1. Summary]

The present inventors have conducted extensive studies in order to solve the above-described problems. As a result, the present inventors have arrived at means for providing an anti-reflection function. Specifically, fine and dense irregularities (moth eyes) are formed on opposite surfaces of a face protective transparent substrate.

Generally, when a shape with periodic irregularities is provided on a surface of an optical element, diffraction occurs when light passes through the shape with periodic irregularities, and the amount of the straight component of the transmitted light decreases significantly. However, when the pitch of the shape with irregularities is shorter than the wavelength of the transmitted light, no diffraction occurs, and an anti-reflection effect effective for light having a wavelength corresponding to the pitch or depth of the shape with irregularities can be obtained. Examples of previously proposed moth-eye structures forming the above shape with irregularities may include structures having various shapes such as a bell shape and a truncated elliptic cone shape. These structures have a planar shape with a curve such as a circular or elliptical planar shape.

In the face protective optical element of the present invention, fine and dense irregularities are formed on its opposite surfaces, so that reflection at the interfaces between the optical element and air can be effectively reduced. Examples of the material forming the optical element may include ultraviolet curable resins.

The present inventors have conducted further studies on the face protective optical element having the moth eye structures on its surface and found that the following problem occurs. Specifically, when an ultraviolet curable resin is used to form fine and dense irregularities on the surface of the face protective optical element, the surface becomes hydrophobic and is very easily fogged by breath. To address this fogging problem, various methods of imparting fogging resistance to the surface by forming a hydrophilic coating on the surface have been proposed. However, when the coating is formed, the fine and dense irregularities are filled with the coating, so that the anti-reflection effect is lost. The present inventors have conducted further studies in order to prevent the occurrence of such a problem and found a configuration and means in which fine and dense irregularities are formed on opposite surfaces of a transparent substrate by using a hydrophilic ultraviolet curable resin.

[2. Configuration of Face Protective Optical Element]

Figure 1:
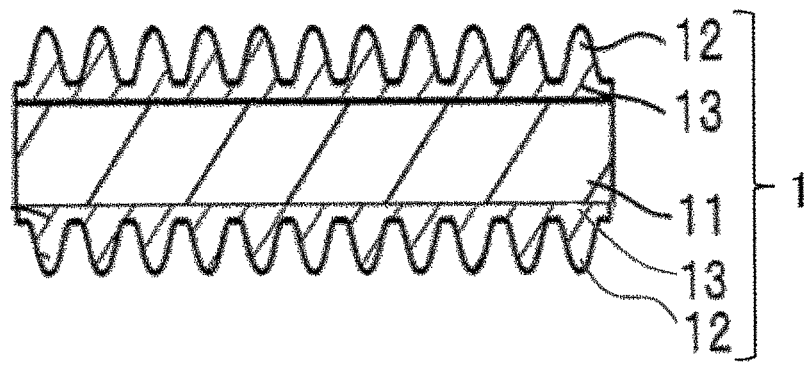
FIG. 1 is a cross-sectional view illustrating an example of the configuration of a face protective optical element according to an embodiment of the present invention.

FIG. 1 is a cross-sectional view illustrating an example of the configuration of a face protective optical element according to an embodiment of the present invention. As shown in FIG. 1, the face protective optical element 1 has, on its front and rear surfaces, fine irregular structures (hereinafter may be appropriately referred to as "moth eye structures") having an anti-reflection function.

(2.1 Optical Element)

The optical element 1 is a moth eye film having a front surface (a first surface) and a rear surface (a second surface) opposite to each other and each having an anti-reflection function.

The surfaces of the optical element 1 each are an irregular surface on which structures 12 are disposed at a pitch equal to or less than the wavelength of visible light. Such irregular surfaces disposed on the front and rear surfaces of the optical element 1 can impart an optical adjustment function with high visibility to the optical element 1. Therefore, a face protector with high visibility can be realized. The optical adjustment function is the function of adjusting optical properties including transmission and reflection properties. The optical element 1 is transparent to, for example, visible light, and its refractive index n is within the range of preferably 1.40 or more and 2.00 or less and more preferably 1.43 or more and 2.00 or less. Preferably, the transmittance of light having a wavelength of 550 nm is 98.5% or higher.

FIG. 2A is a perspective view illustrating an example of the surface shape of the optical element 1. The optical element 1 includes, for example, a substrate 11 having a front surface and a rear surface and a plurality of structures 12 disposed on the surfaces of the substrate 11 through base layers 13. The plurality of structures 12 are disposed on the surfaces of the substrate 11 so as to form a plurality of rows. The irregular surface on the front surface of the substrate 11 is formed from a plurality of structures 12 arranged as described above. The structures 12 are, for example, convex or concave with respect to the surface of the substrate 11. In the example shown in FIG. 2A, the structures 12 are convex with respect to the surface of the substrate 11. Generally, the structures 12 and the substrate 11 are formed separately or integrally. When the structures 12 and the substrate 11 are formed separately, the base layers 13 are provided as needed.

The base layer 13 is formed by curing, for example, the same transparent energy ray curable resin composition as that for the structures 12.

Preferably, the refractive index of the structures 12 is the same or substantially the same as the refractive index of the substrate 11. This is because internal reflection can be suppressed to increase contrast.

When the structures 12 and the substrate 11 are formed separately, unillustrated adhesive layers may be provided on the outermost layers of the substrate 11, and then the substrate 11 and the base layers 13 may be laminated onto each other. The laminate may be used as the transparent substrate in the optical element 1 of the present invention.

(2.2 Substrate)

Preferably, the substrate 11 has the same refractive index as that of the structures 12 and is transparent. The substrate 11 may be formed by laminating transparent members. Examples of the material of the substrate 11 may include transparent plastic materials and transparent materials mainly composed of glass, but the material is not particularly limited to these materials.

The glass used is, for example, soda-lime glass, lead glass, hard glass, quartz glass, and liquid crystal glass (see "KAGAKU BINRAN" (Chemical Handbook), Basic Edition, P.I-537, edited by The Chemical Society of Japan). From the viewpoint of optical properties such as transparency, refractive index, and dispersion and other properties such as shock resistance, heat resistance, and durability, the plastic material is preferably any of (meth)acrylic-based resins such as polymethyl methacrylate and copolymers of methyl methacrylate with vinyl monomers such as other alkyl (meth)acrylate and styrene; polycarbonate-based resins such as polycarbonate and diethylene glycol bisallyl carbonate (CR-39); thermosetting (meth)acrylic-based resins such as a homopolymer and copolymers of (brominated) bisphenol A type di(meth)acrylate and a polymer and copolymers of a urethane-modified monomer of (brominated) bisphenol A mono(meth)acrylate; polyesters, particularly polyethylene terephthalate, polyethylene naphthalate, and unsaturated polyesters; acrylonitrile-styrene copolymers; polyvinyl chloride; polyurethane; epoxy resins; polyarylate; polyether sulfone; polyether ketone; cycloolefin polymers (product names: ARTON and ZEONOR); and cycloolefin copolymers. An aramid-based resin with heat resistance taken into consideration may also be used. The (meth) acrylate means acrylate or methacrylate. The (meth)acrylic-based resin means an acrylic-based resin or a methacrylic-based resin.

When the structures 12 and the substrate 11 are formed separately and a plastic material is used for the substrate 11, undercoat layers may be provided as surface treatment, in order to further improve the surface energy, coatability, flatness, etc. of the surfaces of the plastic. Examples of the undercoat layers may include organoalkoxy metal compounds, polyester, acrylic-modified polyester, and polyurethane. To obtain the same effect as the effect of the undercoat layers provided, the surfaces of the substrate 11 may be subjected to corona discharge treatment, UV irradiation treatment, etc.

When the structures 12 and the substrate 11 are formed separately and the substrate 11 is a plastic film, the substrate 11 can be obtained using, for example, a method including stretching any of the above resins or a method including diluting any of the above resins with a solvent, forming a film of the resin, and drying the film. Preferably, the thickness of the substrate 11 is appropriately selected according to the application of the optical element 1. The thickness is, for example, about 10 μm or more and about 500 μm or less, preferably about 50 μm or more and about 500 μm or less, and more preferably about 50 μm or more and about 300 μm or less. When the thickness is 10 μm or more, the protective performance against flying objects is improved. When the thickness is 500 μm or less, weight saving can be achieved. In addition, since the substrate 11 is flexible, it can be deformed into a curved shape, so that the wearing comfort of the protective member is improved.

Examples of the shape of the substrate 11 may include a film shape and a plate shape, but the shape of the substrate 11 is not particularly limited to these shapes. The film is defined to include a sheet.

(2.3 Structures)

FIG. 2B is a plan view illustrating an example of the arrangement of a plurality of structures 12 formed on the surface of the substrate 11. As shown in FIG. 2B, the plurality of structures 12 are two-dimensionally arranged on the surface of the substrate 11. Preferably, the structures 12 are periodically arranged in two dimensions at a short average arrangement pitch equal to or less than a target wavelength band in which light reflection is reduced and light transmission is improved.

The plurality of structures 12 are arranged in such a manner that a plurality of tracks T1, T2, T3, . . . (hereinafter may be collectively referred to as "tracks T") are formed on the surface of the substrate 11. In the present technique, the tracks mean portions in which a plurality of structures 12 are arranged in a row. The tracks T may have a linear shape, an arc shape, etc., and the tracks T having any of these shapes may be wobbled (meandered). Such wobbled tracks T can suppress the occurrence of unevenness in appearance.

When the tracks T are wobbled, it is preferable that the wobbles of the respective tracks T on the substrate 11 be synchronized. Specifically, the wobbles are preferably synchronized wobbles. When the wobbles are synchronized as described above, the shape of unit cells in a hexagonal lattice or a quasi-hexagonal lattice can be maintained, and a high filling factor can be maintained. Examples of the waveform of the wobbled tracks T may include sinusoidal waves and triangular waves. The waveform of the wobbled tracks T is not limited to a periodic waveform and may be an aperiodic waveform. The amplitude of the wobbles of the wobbled tracks T is selected to be, for example, about 10 nm to about 1 μm.

For example, the structures 12 are arranged such that structures 12 in adjacent two tracks T are positioned so as to be mutually shifted by a half pitch. Specifically, structures 12 in one (for example, T2) of the two adjacent tracks T are disposed at midpoints between structures 12 in the other track (for example, T1) (i.e., points shifted by a half pitch). Therefore, as shown in FIG. 2B, structures 12 in adjacent three tracks (T1 to T3) are arranged so as to form a hexagonal lattice pattern or a quasi-hexagonal lattice pattern with the centers of the structures 12 located at points a1 to a7.

The hexagonal lattice used herein means a regular hexagonal lattice. The quasi-hexagonal lattice is different from the regular hexagonal lattice and means a distorted regular hexagonal lattice. For example, when the structures 12 are arranged on straight lines, the quasi-hexagonal lattice means a distorted hexagonal lattice obtained by stretching a regular hexagonal lattice in its linear arrangement direction (track direction). When the structures 12 are arranged in an arc shape, the quasi-hexagonal lattice means a hexagonal lattice obtained by distorting a regular hexagonal lattice in an arc shape or a hexagonal lattice obtained by stretching a regular hexagonal lattice in its arrangement direction (track direction) to distort the lattice and then distorting the resultant lattice in an arc shape. When the structures 12 are arranged in a meandering manner, the quasi-hexagonal lattice means a hexagonal lattice obtained by distorting a regular hexagonal lattice according to the meandering arrangement of the structures 12 or a hexagonal lattice obtained by stretching a regular hexagonal lattice in its arrangement direction (track direction) to distort the lattice and then distorting the resultant lattice according to the meandering arrangement of the structures 12.

When the structures 12 are arranged so as to form a quasi-hexagonal lattice pattern, it is preferable that an arrangement pitch P1 of structures 12 in a single track (for example, T1) (the arrangement pitch P1 is, for example, the distance between a1 and a2) be larger than an arrangement pitch P2 of structures 12 in adjacent two tracks (for example, T1 and T2) (the arrangement pitch P2 is, for example, the distance between a1 and a7 or a2 and a7), i.e., the arrangement pitch P2 of structures 12 arranged in ±θ directions with respect to the extending direction of the tracks, as shown in FIG. 2B. By arranging the structures 12 as described above, the filling density of the structures 12 can be further increased.

Specific examples of the shape of the structures 12 may include cone shapes, columnar shapes, needle shapes, hemispherical shapes, semiellipsoidal shapes, and polygonal shapes. The shape of the structures 12 is not limited to these shapes, and any other shape may be employed. Examples of the cone shapes may include, but are not limited to, cone shapes with sharp apexes, cone shapes with flat apexes, and cone shapes with convex or concave curved surfaces at their apexes. Examples of the cone shapes with convex curved surfaces at their apexes may include cone shapes with quadric surfaces such as paraboloidal surfaces. Alternatively, cones with their cone face curved convexly or concavely may be used. When a roll master is produced using a roll master exposure apparatus (see FIG. 6) described later, it is preferable that the shape of the structures 12 used be an elliptic cone shape with a convex curved surface at its apex or a truncated elliptic cone shape with a flat apex and that the direction of the major axis of the ellipse forming the bottom surface of the elliptic cone shape match the extending direction of the tracks T. The elliptic, spherical, and ellipsoidal shapes are meant to include not only mathematically defined perfect elliptic, spherical, and ellipsoidal shapes but also somewhat distorted elliptic, spherical, and ellipsoidal shapes. The planar shape of the structures 12 is not limited to elliptic shapes and may be a circle.

From the viewpoint of improving the optical adjustment function, a cone shape having an apex inclined gently while the inclination increases gradually from the central portion toward the bottom is preferred. Moreover, from the viewpoint of improving the optical adjustment function, a cone shape in which the inclination at the central portion is larger than the inclination at the bottom and at the apex or a cone shape having a flat apex is preferred. When the structures 12 have an elliptic cone shape or a truncated elliptic cone shape, it is preferable that the direction of the major axis of their bottom surface be parallel to the extending direction of the tracks.

Preferably, each of the structures 12 has, at its bottom circumferential portion, a curved surface portion 15 having a height gradually decreasing from the top toward a lower portion. This is because, in a process of producing the optical element 1, the optical element 1 can be easily released from a master etc. The curved surface portion 15 may be provided only part of the circumference of each structure 12. However, from the viewpoint of improving the release characteristics, it is preferable to provide the curved surface portion 15 over the entire circumference of the structure 12.

Preferably, a protruding portion 14 is provided around part of the circumference of each of the structures 12 or over the entire circumference thereof. This is because, even when the filling factor of the structures 12 is low, the reflectance can be reduced. From the viewpoint of the ease of molding, the protruding portion 14 is disposed between adjacent structures 12. Alternatively, a surface around part of or the entire circumference of each structure 12 may be roughened to form fine irregularities. Specifically, for example, a surface between adjacent structures 12 may be roughened to form fine irregularities. For example, a fine hole may be formed on a surface, for example, the apex, of each of the structures 12.

Figure 2:
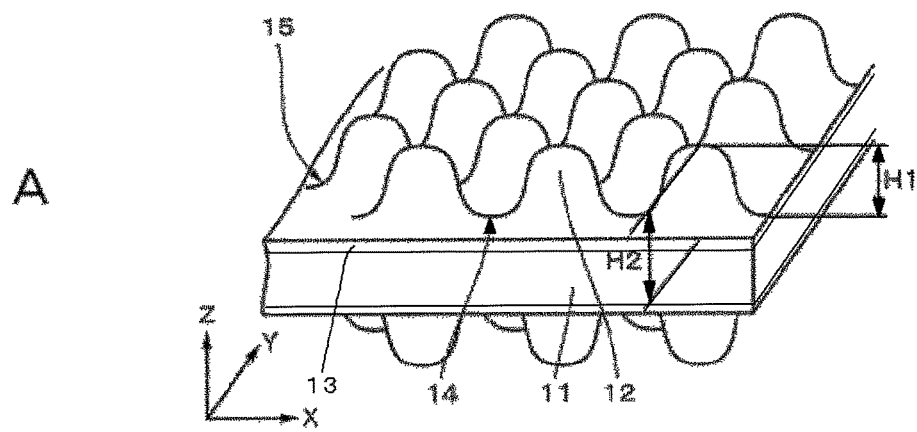
FIG. 2A is a perspective view illustrating an example of the surface shape of the optical element.
FIG. 2B is a plan view illustrating an example of the arrangement of a plurality of structures formed on a surface of the optical element.
Figure 2:
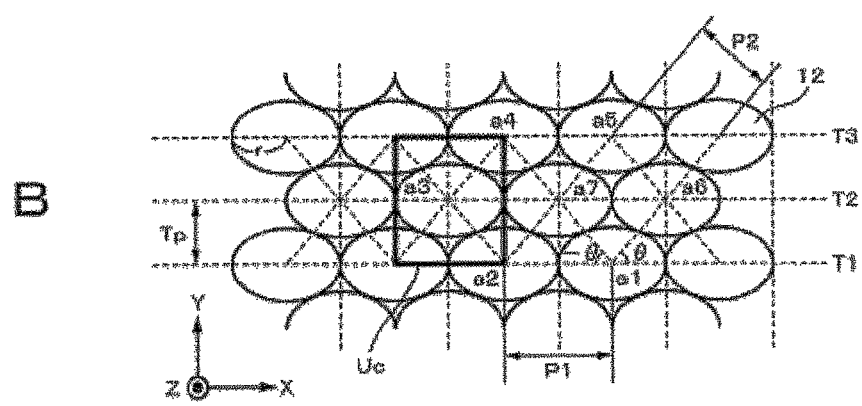

In FIGS. 1 and 2, the structures 12 have the same size, shape, and height. However, the configuration of the structures 12 is not limited thereto. Structures 12 with two or more different sizes, shapes, and heights may be formed on the surfaces of the substrate.

Preferably, the height H1 of the structures 12 in the extending direction of the tracks (X direction) is less than the height H2 of the structures 12 in the arrangement direction of the tracks (Y direction). Specifically, it is preferable that the heights H1 and H2 of the structures 12 satisfy the relation H1<H2. This is because, if the structures 12 are arranged such that the relation H1 H2 holds, the arrangement pitch P1 in the extending direction of the tracks must be increased and therefore the filling factor of the structures 12 in the extending direction of the tracks decreases. The reduction in the filling factor results in a reduction in the optical adjustment function.

The heights H1 and H2 may not be the same for all the structures 12, and the structures 12 may be formed so as to have a certain height distribution. By disposing structures 12 having a height distribution, the wavelength dependence of the optical adjustment function can be reduced. Therefore, an optical element 1 having an excellent optical adjustment function can be realized.

The height distribution means that structures 12 with at least two different heights are disposed on the surfaces of the substrate 11. For example, structures 12 having a reference height and structures 12 having a height different from the height of the above structures 12 may be provided on the surfaces of the substrate 11. In this case, the structures 12 having a height different from the reference height may be, for example, disposed periodically or aperiodically (randomly) on the surfaces of the substrate 11. The direction of the periodicity may be, for example, the extending direction of the tracks or the row direction.

The aspect ratio of the structures 12 disposed on the surfaces of the substrate 11 (their height or depth H/an arrangement pitch P) is preferably 0.66 or more and 1.96 or less and more preferably 0.76 or more and 1.96 or less. When the aspect ratio is 0.66 or more, low-reflection characteristics can be improved. When the aspect ratio is 1.96 or less, mold releasability etc. can be improved.

The above height of the structures 12 is the height in an inter-track direction (the Y direction). Generally, the height H1 of the structures 12 in the extending direction of the tracks (the X direction) is less than the height in the inter-track direction (the Y direction), and the height of the structures 12 in directions other than the extending direction of the tracks is substantially the same as the height in the inter-track direction. Therefore, in the present invention, the height of the structures 12 in the inter-track direction is used as their representative height, unless otherwise specified. However, when the structures 12 are recesses, the height H of the structures 12 is the depth H of the structures 12.

The arrangement pitch P is the average arrangement pitch defined by the following formula.

$$\text{Average arrangement pitch } P=(P1+P2+P2)/3$$

(P1: the arrangement pitch of the structures in the extending direction of the tracks (the period in the extending direction of the tracks), P2: the arrangement pitch of structures in adjacent tracks)

The arrangement direction θ of structures in different tracks with respect to the extending direction of the tracks is represented by $$\theta=60°-\delta.$$

Here, δ is preferably $0°<\delta\leq11°$ and more preferably $3°\leq\delta\leq6°$.

Preferably, the arrangement pitch P1 of the structures 12 in the extending direction of the tracks and the arrangement pitch P2 of structures in different tracks are equal to or less than a target light wavelength band for the optical adjustment function. The target light wavelength band for the optical adjustment function is, for example, the wavelength band of ultraviolet rays, the wavelength band of visible rays, or the wavelength band of infrared rays. The wavelength band of ultraviolet rays is a wavelength band of 10 nm to 360 nm, and the wavelength band of visible rays is a wavelength band of 360 nm to 830 nm. The wavelength band of infrared rays is a wavelength band of 830 nm to 1 mm.

The height H of the structures 12 is within the range of preferably 180 nm or more and 300 nm or less, more preferably 190 nm or more and 300 nm or less and still more preferably 190 nm or more and 230 nm or less. When the height H of the structures 12 is 180 nm or more, the low reflection characteristics can be improved. When the height H of the structures 12 is 300 nm or less, the mold releasability etc. can be improved.

When the arrangement of the structures 12 forms a hexagonal lattice pattern or a quasi-hexagonal lattice pattern, it is preferable that the ratio P1/P2 satisfy the relation of $1.00 \leq P1/P2 \leq 1.1$, where P1 is the arrangement pitch of the structures 12 in the extending direction of the tracks and P2 is the arrangement pitch of structures 12 in adjacent tracks. When the ratio is within the above numerical range, the filling factor of the structures 12 having an elliptic cone or truncated elliptic cone shape can be increased, so that the optical adjustment function can be improved.

The filling factor of the structures 12 on the surfaces of the substrate 11 has an upper limit of 100% and is within the range of preferably 65% or more, more preferably 73% or more, and still more preferably 86% or more. When the filling factor is within the above range, anti-reflective properties can be improved. Preferably, to increase the filling factor, the lower portions of adjacent structures 12 are joined to each other. Alternatively, for example, the ellipticity of the bottom surface of each of the structures 12 is adjusted to impart distortion to the structures 12.

The filling factor (average filling factor) of the structures 12 is a value determined in the following manner.

First, a top view image of a surface of the optical element 1 is taken using a scanning electron microscope (SEM). Next, a unit cell Uc is arbitrarily selected in the SEM photograph taken, and the arrangement pitch P1 and track pitch Tp in the unit cell Uc are measured (see FIG. 2B). The area S of the bottom surface of a structure 12 located at the center of the unit cell is measured using image processing. Next, the measured arrangement pitch P1, the track pitch Tp, and the area S of the bottom surface are used to determine the filling factor using the following formula.

Filling factor=($S$(hex.)/$S$(unit))×100

The area of the unit cell when the arrangement of the structures 12 is a hexagonal lattice pattern or a quasi-hexagonal lattice pattern: $S$(unit)=P1×2Tp The area of the bottom surfaces of structures 12 present in the unit cell: $S$(hex.)=2S The above-described processing for computing the filling factor is repeated for 10 unit cells arbitrarily selected in the SEM photograph taken. Then the simple average (arithmetic average) of the measured values is computed to determine the average filling factor, and the average filling factor is used as the filling factor of the structures 12 on the surface of the substrate.

When the structures 12 overlap with each other or substructures such as protruding portions 14 are present between the structures 12, the filling factor can be determined using a method in which the area ratio is decided using the area of a portion having a height corresponding to 5% of the height of the structures 12 as a threshold value.

Preferably, the structures 12 are connected to each other such that their lower portions overlap with each other. Specifically, it is preferable that part of or the entire lower portions of adjacent structures 12 overlap with each other and that they be connected in one or both of the track direction and the θ direction. When the lower portions of the structures 12 overlap with each other as described above, the filling factor of the structures 12 can be increased. Preferably, the structures 12 overlap with each other in portions equal to or less than ¼ of the maximum value of the wavelengths of light in a use environment. This is because an excellent optical adjustment function can be obtained.

The ratio of the radial distance 2r of the bottom surface of a structure to the arrangement pitch P1 ((2r/P1)×100) is within the range of preferably 85% or more, more preferably 90% or more, and still more preferably 95% or more. This is because, when the ratio is within the above range, the filling factor of the structures 12 can be increased and the optical adjustment function can thereby be improved. If the ratio ((2r/P1)×100) is large and the degree of overlap between the structures 12 becomes excessively large, the optical adjustment function tends to become low. Therefore, it is preferable to set the upper limit of the ratio ((2r/P1)×100) such that the structures 12 are joined to each other in portions equal to or less than ¼ of the maximum value in the wavelength band of light in the use environment, with the refractive index taken into consideration in an optical path length. The arrangement pitch P1 is the arrangement pitch of the structures 12 in the extending direction of the tracks (the X direction), and the radial distance 2r is the radial distance of the bottom surface of each of the structures 12 in the extending direction of the tracks (the X direction). When the bottom surface of each of the structures 12 is circular, the radial distance 2r is the diameter. When the bottom surface of each of the structures 12 is elliptic, the radial distance 2r is the major axis.

When the structures 12 form a quasi-hexagonal lattice pattern, the ellipticity e of the bottom surface of each of the structures 12 is preferably 100%<e≤150%. This is because, when the ellipticity is within this range, the filling factor of the structures 12 can be increased and an excellent optical adjustment function can be obtained.

The thickness of the substrate 11 is appropriately selected according to the application of the optical element 1, and it is preferable to impart flexibility and stiffness to the substrate 11 according to the application.

The structures 12 are disposed on the opposite surfaces of the substrate 11. The heights of the structures 12 on the opposite surfaces are not necessarily the same so long as the heights are within the above range.

Therefore, it is preferable that Ha:T:Hb=18 to 30:1,000 to 50,000:18 to 30, where Ha is the height of the structures 12 disposed on one surface of the substrate 11, T is the thickness of the transparent substrate, and Hb is the height of the structures 12 disposed on the other surface of the transparent substrate (the surface opposite to the surface on which the structures 12 having the height Ha are disposed).

The optical element of the present invention includes an embodiment in which transparent members each including a base layer 13 and structures 12 formed on one side thereof are bonded with an adhesive to opposite sides of another transparent member having the same refractive index as that of the above transparent members. In this case, the thickness of the transparent substrate of the optical element is a value obtained by subtracting the thicknesses of the structures on the front and rear sides from the total thickness of the laminate formed by bonding. In this embodiment, also the adhesive has the same refractive index as those of the structures and the substrate.

The optical element of the present invention is aimed to be used for a surgical operation etc. Therefore, by detachably attaching the optical element of the present invention to an attachment jig of a goggle-type or face mask-type optical element or securing the optical element to a face mask, a face protector can be obtained. Such a face protector is also included in the present invention.

Figure 3:
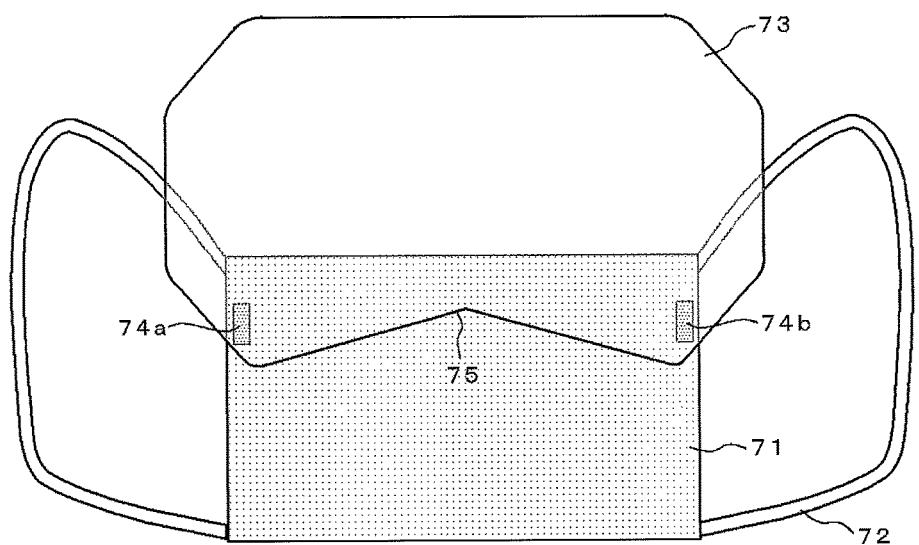
FIG. 3 is a plan view of a face protector in an embodiment of the present invention.
Figure 4:
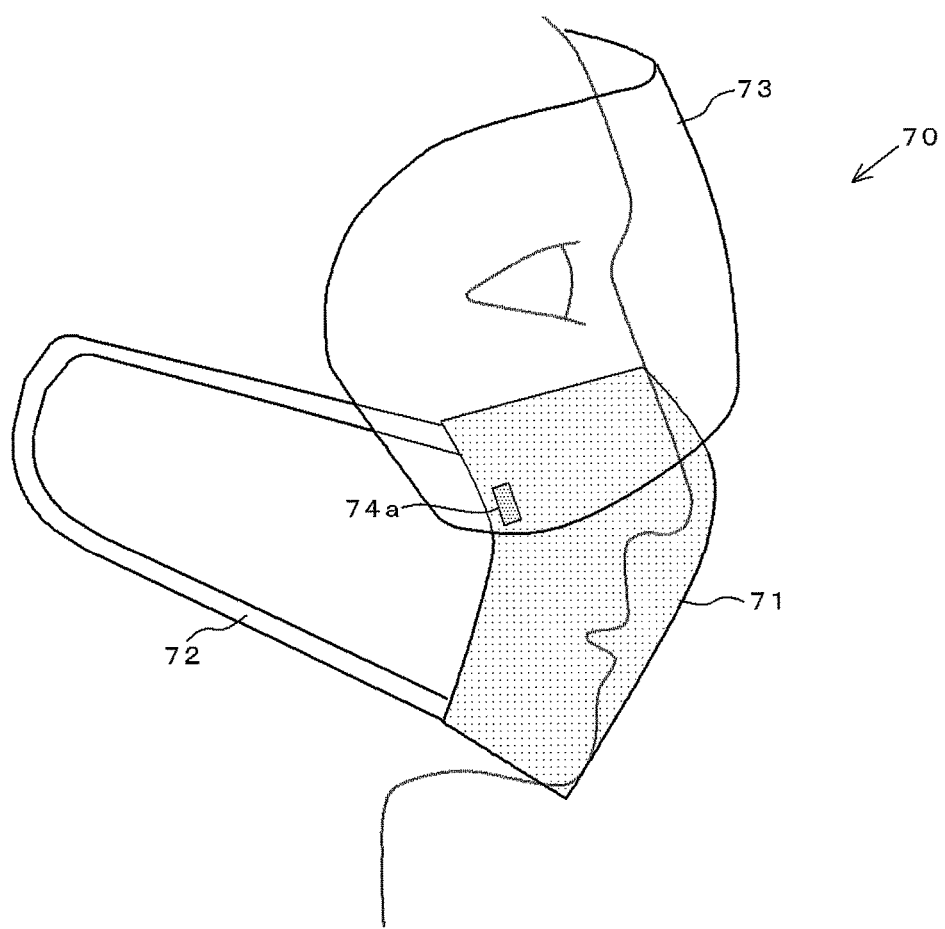
FIG. 4 is a perspective view of the face protector in the embodiment of the present invention, the face protector being worn on the face.

FIG. 3 is a plan view of an embodiment of a face protector 70 including a face mask 71 and the optical element 1 of the present invention secured thereto, and FIG. 4 is a perspective view of the face protector 70 worn on the face.

The face mask 71 covers the nose, mouse, and part of the jaws of the wearer and is held on the face with strings 72 etc. The face mask 71 used can be any medical face mask and is, for example, a breathable face mask having a multilayer structure for preventing intrusion of bacteria.

The optical element 1 is secured to the face mask 71 at joint regions 74a and 74b and serves as an eye shield 73 that prevents liquid and flying objects from flying toward the eyes of the wearer without obstructing the field of view of the wearer.

The eye shield 73 has a width sufficiently larger than the width of the face mask 71 and has a size enough to cover a wide area around the eyes of the wearer. The eye shield 73 has a concave portion 75 at the center of the lower edge. When the face protector 70 is worn on the face, the concave portion 75 allows the eye shield 73 to bend around the nose of the wearer, so that the eye shield 73 is bent into a curved surface shape along the face.

The joint regions 74a and 74b are disposed in the left and right end portions of the face mask 71 that are located on opposite sides of the nose when the face mask 71 is worn. Examples of the method of securing the eye shield 73 to the face mask 71 at the joint regions 74a and 74b may include ultrasonic welding, heat bonding, and mechanical joining such as rivets. The joint regions 74a and 74b may have any size so long as the eye shield 73 can be secured thereto. For example, the joint regions 74a and 74b may have a width of 3 to 15 mm and a length of 5 to 30 mm. In this manner, it is unnecessary to press the eye shield 73 against the face though the strings 72, and the face protector 70 can be easily attached and detached.

In the present invention, the optical element 1 of the present invention used as the eye shield 73 may be detachably attached to the face mask 71.

[3. Configuration of Master]

Figure 5:
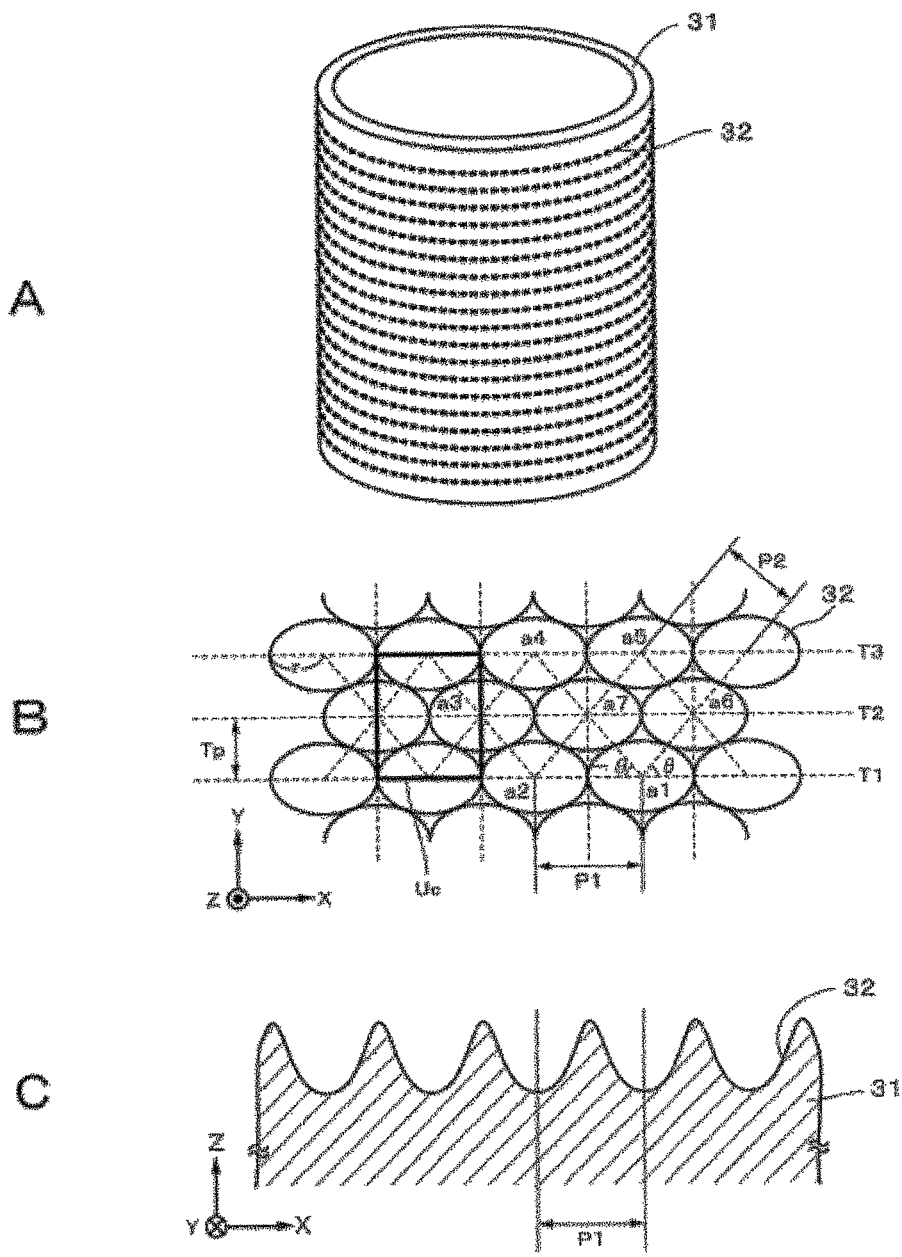
FIG. 5A is a perspective view illustrating an example of the configuration of a roll master.
FIG. 5B is an enlarged plan view illustrating part of the roll master shown in FIG. 5A.
FIG. 5C is a cross-sectional view along tracks T1, T3, . . .

FIG. 5A is a perspective view illustrating an example of the configuration of a roll master used to produce the optical element 1 having the configuration described above. FIG. 5B is an enlarged plan view illustrating part of the roll master shown in FIG. 5A. FIG. 5C is a cross-sectional view along tracks T1, in FIG. 5B. More specifically, the roll master 31 is a master for molding a plurality of structures 12 on a surface of the substrate described above. The roll master 31 has, for example, a circular columnar or tubular shape, and the circular columnar or tubular surface is a molding surface for molding the plurality of structures 12 on the surface of the substrate. For example, a plurality of structures 32 are arranged two-dimensionally on the molding surface. For example, the structures 32 are recessed or protrude from the molding surface. In the example shown in FIG. 5C, the structures 32 are recessed from the molding surface. The material used for the roll master 31 can be, for example, glass, but the material is not particularly limited thereto.

The plurality of structures 32 arranged on the molding surface of the roll master 31 and the plurality of structures 12 arranged on the surface of the substrate 11 described above have an inverted concave-convex relation with each other. Specifically, the shape, arrangement, arrangement pitch, etc. of the structures 32 of the roll master 31 are the same as those of the structures 12 of the substrate 11.

[4. Configuration of Exposure Apparatus]

Figure 6:
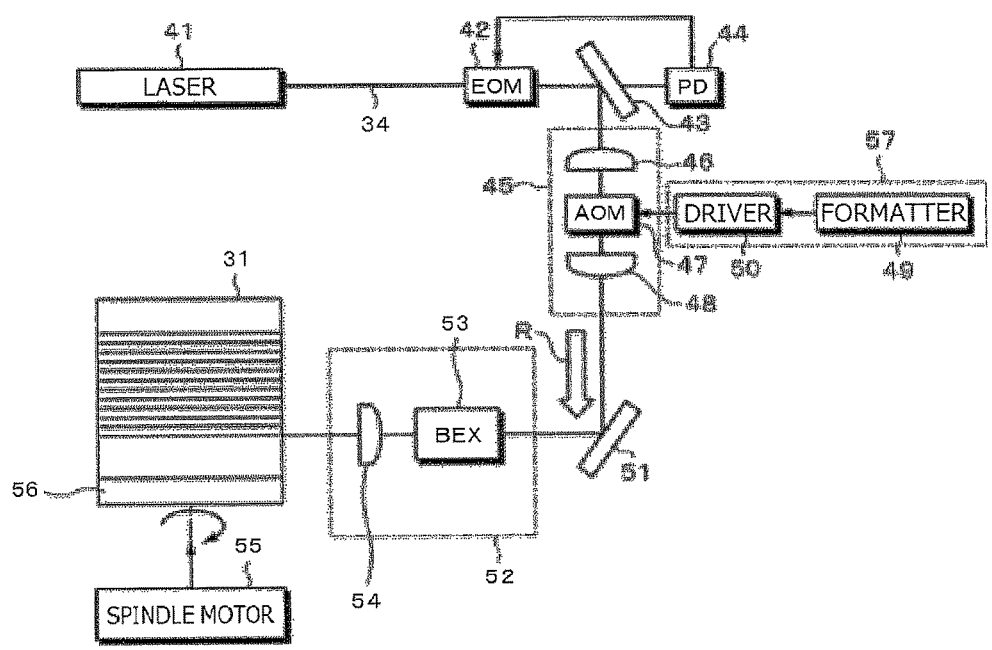
FIG. 6 is a schematic diagram illustrating an example of the configuration of a roll master exposure apparatus for producing the roll master.

FIG. 6 is a schematic diagram illustrating an example of the configuration of a roll master exposure apparatus for producing the roll master. This roll master exposure apparatus is configured on the basis of an optical disc recording apparatus.

A laser beam source 41 is a light source for light exposure of a resist film formed on the surface of the roll master 31 used as a recording medium and emits a recording laser beam 34 having, for example, a wavelength $\lambda=266$ nm. The laser beam 34 emitted from the laser beam source 41 travels in a straight line as a collimated beam and enters an electro optical modulator (EOM) 42. The laser beam 34 passing through the electro optical modulator 42 is reflected by a mirror 43 and guided to a modulation optical system 45.

The mirror 43 is composed of a polarization beam splitter and has the function of reflecting one of polarized components and allowing the other polarized component to pass therethrough. The polarized component passing through the mirror 43 is received by a photodiode 44, and the electro optical modulator 42 is controlled on the basis of the received light signal to perform phase modulation of the laser beam 34.

In the modulation optical system 45, the laser beam 34 is focused on an acousto-optic modulator (AOM) 47 formed of glass ($SiO_2$) etc. through a condenser lens 46. The laser beam 34 is subjected to intensity modulation through the acousto-optic modulator 47, diverged, and then converted to a collimated beam through a lens 48. The laser beam 34 emitted from the modulation optical system 45 is reflected by a mirror 51 and guided to a movable optical table 52 horizontally and parallel thereto.

The movable optical table 52 includes a beam expander 53 and an objective lens 54. The laser beam 34 guided to the movable optical table 52 is shaped into a desired beam shape by the beam expander 53 and then directed onto a resist layer on the roll master 31 through the objective lens 54. The roll master 31 is placed on a turntable 56 connected to a spindle motor 55. The step of exposing the resist layer to light is performed by rotating the roll master 31 and irradiating the resist layer intermittently with the laser beam 34 while the laser beam 34 is moved in a direction of the height of the roll master 31. Latent images formed have a substantially elliptic shape with a major axis extending in a circumferential direction. The laser beam 34 is moved by moving the movable optical table 52 in the direction of an arrow R.

The exposure apparatus includes a control mechanism 57 for forming, on the resist layer, latent images corresponding to a two-dimensional hexagonal lattice pattern or the two-dimensional quasi-hexagonal lattice pattern shown in FIGS. 2B and 5B. The control mechanism 57 includes a formatter 49 and a driver 50. The formatter 49 includes a polarity inversion unit, and this polarity inversion unit controls the timing of irradiation of the resist layer with the laser beam 34. The driver 50 controls the acousto-optic modulator 47 in response to the output from the polarity inversion unit.

In this roll master exposure apparatus, a polarity inversion formatter signal is synchronized with a rotation controller to generate a signal for each track such that a spatially linked two-dimensional pattern is obtained, and intensity modulation is performed by the acousto-optic modulator 47. By performing patterning at a constant angular velocity (CAV), an appropriate number of revolutions, an appropriate modulation frequency, and an appropriate feed pitch, a hexagonal lattice pattern or a quasi-hexagonal lattice pattern can be recorded.

[5. Method of Producing Face Protective Optical Element]

Figure 7:
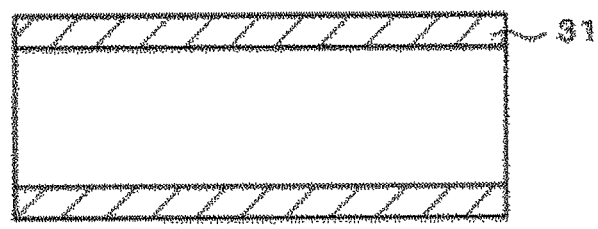
FIG. 7 is a series of process diagrams illustrating an example of a method of producing the face protective optical element according to the embodiment of the present invention.
Figure 7:
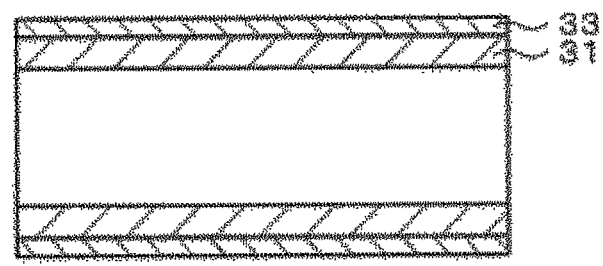
Figure 7:
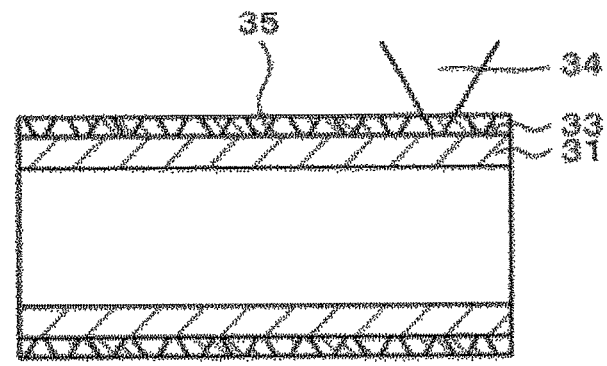
Figure 8:
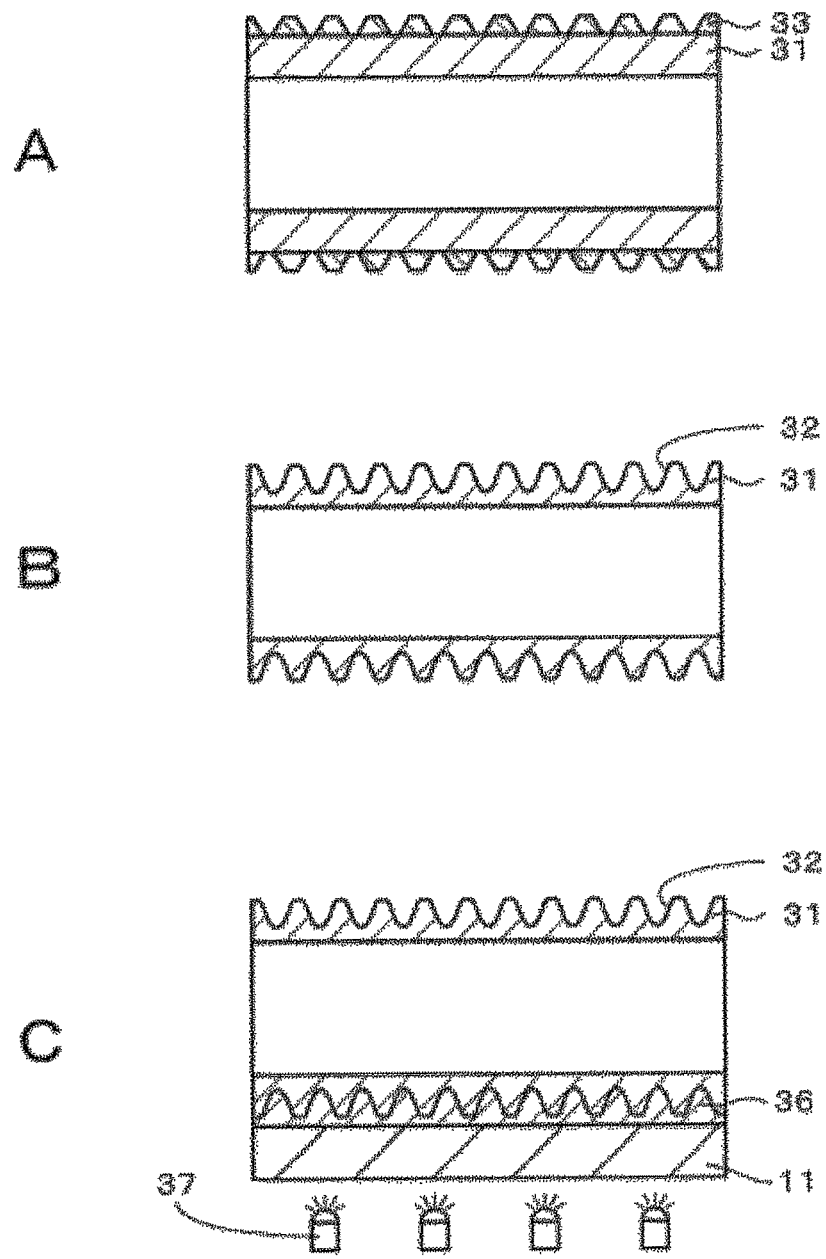
FIG. 8 is a series of process diagrams illustrating the example of the method of producing the face protective optical element according to the embodiment of the present invention.
Figure 9:
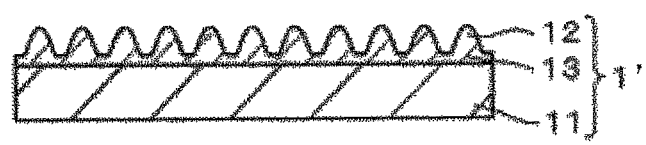
FIG. 9 is a series of process diagrams illustrating the example of the method of producing a face protective optical element according to the embodiment of the present invention.
Figure 9:
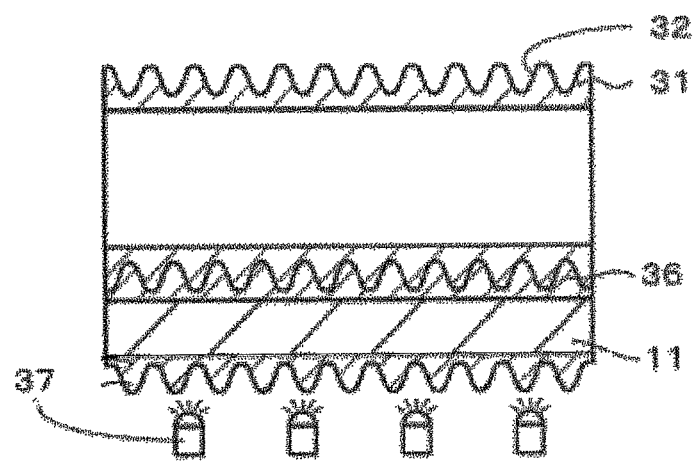
Figure 9:
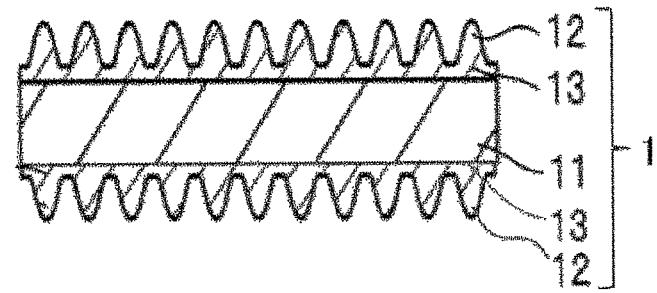

FIGS. 7 to 9 are process diagrams illustrating an example of a method of producing the face protective optical element according to a first embodiment of the present technique.

(5.1 Resist Film Forming Step)

First, as shown in FIG. 7A, a circular columnar or tubular roll master 31 is prepared. The roll master 31 is, for example, a glass master. Next, as shown in FIG. 7B, a resist layer 33 is formed on the surface of the roll master 31. The material used for the resist layer 33 may be, for example, any of organic resists and inorganic resists. For example, a novolac-based resist or a chemically-amplified resist may be used as the organic resist. For example, a metal compound may be used as the inorganic resist.

(5.2 Light Exposure Step)

Next, as shown in FIG. 7C, the resist layer 33 formed on the surface of the roll master 31 is irradiated with the laser beam (exposure beam) 34. Specifically, the roll master 31 is placed on the turntable 56 of the roll master exposure apparatus shown in FIG. 6. Then, the roll master 31 is rotated, and the resist layer 33 is irradiated with the laser beam (exposure beam) 34. In this case, the resist layer 33 is intermittently irradiated with the laser beam 34 while the laser beam 34 is moved in the height direction of the roll master 31 (a direction parallel to the center axis of the circular columnar or tubular roll master 31), and the entire surface of the resist layer 33 is thereby exposed to the light. In this manner, latent images 35 corresponding to the trajectory of the laser beam 34 are formed over the entire surface of the resist layer 33 at a pitch comparable to the wavelength of visible light.

For example, the latent images 35 are arranged on the surface of the roll master so as to form a plurality of track rows and are formed into a hexagonal lattice pattern or a quasi-hexagonal lattice pattern. The latent images 35 have, for example, an elliptic shape with a major axis extending in the extending direction of the tracks.

(5.3 Development Step)

Next, a developer is dropped onto the resist layer 33 while, for example, the roll master 31 is rotated to thereby subject the resist layer 33 to development treatment. In this manner, a plurality of openings are formed in the resist layer 33, as shown in FIG. 8A. When a positive resist is used to form the resist layer 33, the exposed portions exposed to the laser beam 34 have a higher rate of dissolution in the developer than the non-exposed portions, and therefore a pattern corresponding to the latent images 35 is formed in the resist layer 33, as shown in FIG. 8A. The pattern of the openings is a prescribed lattice pattern such as a hexagonal lattice pattern or a quasi-hexagonal lattice pattern.

(5.4 Etching Step)

Next, the surface of the roll master 31 is subjected to etching treatment using, as a mask, the pattern of the resist layer 33 (resist pattern) formed on the roll master 31. In this manner, for example, elliptic cone-shaped or truncated elliptic cone-shaped recesses with a major axis direction in the extending direction of the tracks, i.e., structures 32, can be obtained, as shown in FIG. 8B. The etching used may be, for example, dry etching or wet etching. In this case, by performing etching treatment and asking treatment alternately, a pattern of cone-shaped structures 32, for example, can be formed. The intended roll master 31 can thereby be obtained.

(5.5 Transfer Step 1)

Next, as shown in FIG. 8C, the roll master 31 is brought into intimate contact with a transfer material 36 applied to a substrate 11, and then the transfer material 36 is irradiated with energy rays such as ultraviolet rays from an energy ray source 37 to cure the transfer material 36. Then the substrate 11 integrated with the cured transfer material 36 is released from the roll master 31. In this manner, an optical element 1' in which a plurality of structures 12 are formed on a surface of the substrate 11 is obtained, as shown in FIG. 9A. In this case, if necessary, a base layer 13 may be formed between the structures 12 and the substrate 11.

No particular limitation is imposed on the energy ray source 37, so long as it can emit energy rays that can cure the transfer material 36, such as an electron beam, ultraviolet rays, infrared rays, a laser beam, visible light, ionizing radiation (X-rays, α rays, β rays, γ rays, etc.), microwaves, or high-frequency waves.

The cured product of the transfer material 36 is hydrophilic. Preferably, the transfer material 36 contains at least one hydrophilic functional group. Examples of such a hydrophilic functional group may include a hydroxyl group, a carboxyl group, and a carbonyl group.

Preferably, an ultraviolet curable resin composition is used as the energy ray curable resin composition forming the transfer material 36. The energy ray curable resin composition may contain a filler, a functional additive, etc. as needed.

The ultraviolet curable resin composition contains, for example, an acrylate and an initiator. The ultraviolet curable resin composition contains, for example, a monofunctional monomer, a bifunctional monomer, a polyfunctional monomer, etc. Specifically, the ultraviolet curable resin composition contains one of the materials shown below or a mixture of two or more thereof.

Examples of the monofunctional monomer may include carboxylic acids (acrylic acid), hydroxy compounds (2-hydroxyethyl acrylate, 2-hydroxypropyl acrylate, and 4-hydroxybutyl acrylate), alkyl or alicyclic monomers (isobutyl acrylate, t-butyl acrylate, isooctyl acrylate, lauryl acrylate, stearyl acrylate, isobornyl acrylate, cyclohexyl acrylate, and 2-ethylhexyl acrylate), and other functional monomers (2-methoxyethyl acrylate, methoxyethylene glycol acrylate, 2-ethoxyethyl acrylate, tetrahydrofurfuryl acrylate, benzyl acrylate, ethylcarbitol acrylate, phenoxyethyl acrylate, N,N-dimethylaminoethyl acrylate, N,N-dimethylaminopropyl acrylamide, N,N-dimethyl acrylamide, acryloylmorpholine, N-isopropylacrylamide, N,N-diethylacrylamide, N-vinylpyrrolidone, 2-(perfluorooctyl)ethyl acrylate, 3-perfluorohexyl-2-hydroxypropyl acrylate, 3-perfluorooctyl-2-hydroxypropyl acrylate, 2-(perfluorodecyl)ethyl acrylate, 2-(perfluoro-3-methylbutyl)ethyl acrylate, 2,4,6-tribromophenol acrylate, 2,4,6-tribromophenol methacrylate, and 2-(2,4,6-tribromophenoxyl)ethyl acrylate).

Examples of the bifunctional monomer may include tri(propylene glycol)diacrylate, trimethylolpropane diallyl ether, and urethane acrylate.

Examples of the polyfunctional monomer may include trimethylolpropane triacrylate, dipentaerythritol pentaacrylate, dipentaerythritol hexaacrylate, and ditrimethylolpropane tetraacrylate.

Preferred examples of the resin composition constituting the transfer material 36 may include 2-hydroxyethyl acrylate, acrylic morpholine, glycerol acrylate, polyether-based acrylates, N-vinylformamide, N-vinylpyrrolidone, N-vinylcaprolactone, ethoxydiethylene glycol acrylate, methoxytriethylene glycol acrylate, polyethylene glycol acrylate, EO-modified trimethylolpropane triacrylate, EO-modified bisphenol A diacrylate, aliphatic urethane oligomers, and polyester oligomers.

Examples of the initiator may include 2,2-dimethoxy-1,2-diphenylethan-1-one, 1-hydroxy-cyclohexyl phenyl ketone, and 2-hydroxy-2-methyl-1-phenylpropan-1-one.

The filler used may be any of fine inorganic particles and fine organic particles. Examples of the fine inorganic particles may include fine particles of metal oxides such as $SiO_2$, $TiO_2$, $ZrO_2$, $SnO_2$, and $Al_2O_3$.

Examples of the functional additive may include a leveling agent, a surface conditioner, and an antifoaming agent. Examples of the material of the substrate 11 may include a methyl methacrylate (co)polymer, polycarbonate, a styrene (co)polymer, a methyl methacrylate-styrene copolymer, cellulose diacetate, cellulose triacetate, cellulose acetate butyrate, polyester, polyamide, polyimide, polyether sulfone, polysulfone, polypropylene, polymethylpentene, polyvinyl chloride, polyvinyl acetal, polyether ketone, polyurethane, and glass.

(5.6 Transfer Step 2)

Next, as shown in FIG. 9B, the roll master 31 is brought into intimate contact with a transfer material 36 applied to a surface of the substrate 11 that is opposite to the surface having the structures formed thereon. Then the transfer material 36 is irradiated with energy rays such as ultraviolet rays from the energy ray source 37 to cure the transfer material 36, and the substrate 11 integrated with the cured transfer material 36 is released from the roll master 31. In this manner, an optical element 1 in which a plurality of structures 12 are formed on the opposite surfaces of the substrate 11 is obtained, as shown in FIG. 9C. In this case, if necessary, an adhesive may be disposed between the structures 12 and the substrate 11.

The resin composition used as the transfer material 36 in the transfer step 2 may be the same as the resin composition used in the transfer step 1 above.

(5.7 Shape Forming Step)

The optical element 1 obtained above may be cut into a prescribed size, and the cut product may be used as a face protective shield material.

[Effects]

The thus obtained optical element 1 has, on the opposite surfaces of the transparent substrate, the structures 12 that provide the anti-reflection function. The surfaces of the optical element are hydrophilic, and water contained in breath immediately spreads evenly, so that fogging is prevented. Therefore, a face protective member that resists fogging and has high transmittance can be provided.

[6. Modifications]

(First Modification)

Figure 10:
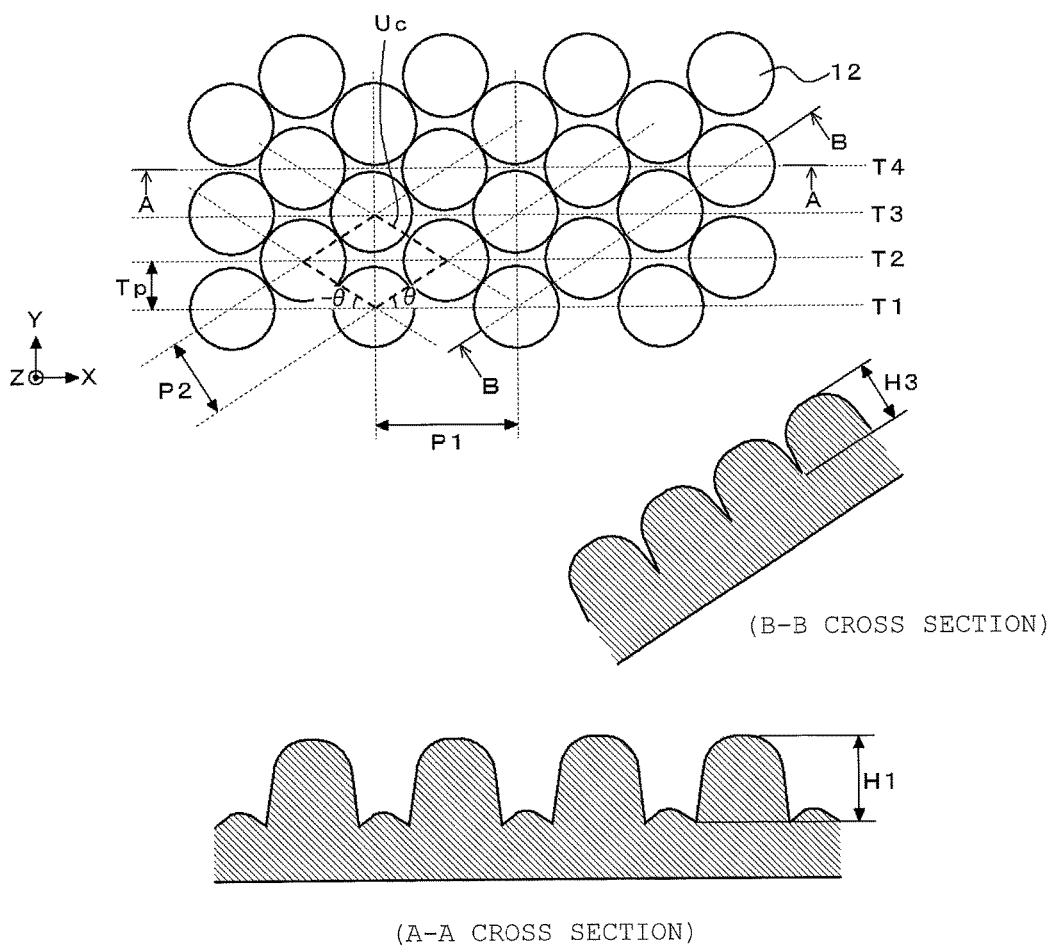
FIG. 10 is a set of a plan view and cross-sectional views illustrating a first modification of the face protective optical element according to the embodiment of the present invention.

As shown in FIG. 10, a plurality of structures 12 disposed on the front surface of the optical element 1 may form a tetragonal lattice pattern or a quasi-tetragonal lattice pattern in adjacent tracks T. Similarly, a plurality of structures 12 disposed on the rear surface of the optical element 1 may form a tetragonal lattice pattern or a quasi-tetragonal lattice pattern in adjacent three tracks T.

The tetragonal lattice used herein means a square lattice. The quasi-tetragonal lattice is different from the square lattice and means a lattice obtained by distorting the square lattice. For example, when the structures 12 are arranged on straight lines, the quasi-tetragonal lattice means a distorted tetragonal lattice obtained by stretching a square lattice in its linear arrangement direction (track direction). When the structures 12 are arranged in an arc shape, the quasi-tetragonal lattice means a tetragonal lattice obtained by distorting a square lattice in an arc shape or a tetragonal lattice obtained by stretching a square lattice in its arrangement direction (track direction) to distort the lattice and then distorting the resultant lattice in an arc shape. When the structures 12 are arranged in a meandering manner, the quasi-tetragonal lattice means a tetragonal lattice obtained by distorting a square lattice according to the meandering arrangement of the structures 12 or a tetragonal lattice obtained by stretching a square lattice in its arrangement direction (track direction) to distort the lattice and then distorting the resultant lattice according to the meandering arrangement of the structures 12.

When the structures 12 are arranged so as to form a tetragonal lattice pattern or a quasi-tetragonal lattice pattern, it is preferable that an arrangement pitch P1 of structures 12 in a single track be larger than an arrangement pitch P2 of structures 12 in adjacent two tracks. It is also preferable that P1/P2 satisfy the relation $1.4 < P1/P2 \leq 1.5$, where P1 is the arrangement pitch of the structures 12 in a single track and P2 is the arrangement pitch of structures 12 in adjacent two tracks. When P1/P2 is within the above numerical range, the filling factor of the structures 12 having an elliptic cone or truncated elliptic cone shape can be increased, so that the optical adjustment function can be improved. Preferably, the height or depth of the structures 12 in a direction 45° or about 45° with respect to the tracks is less than the height or depth of the structures 12 in the extending direction of the tracks.

Preferably, the height H3 of the structures 12 in an arrangement direction (θ direction) oblique to the extending direction of the tracks is less than the height H1 of the structures 12 in the extending direction of the tracks. Specifically, it is preferable that the heights H1 and H3 of the structures 12 satisfy the relation H1>H3.

In the first modification, the same effects as in the first embodiment described above can be obtained.

(Second Modification)

Figure 11:
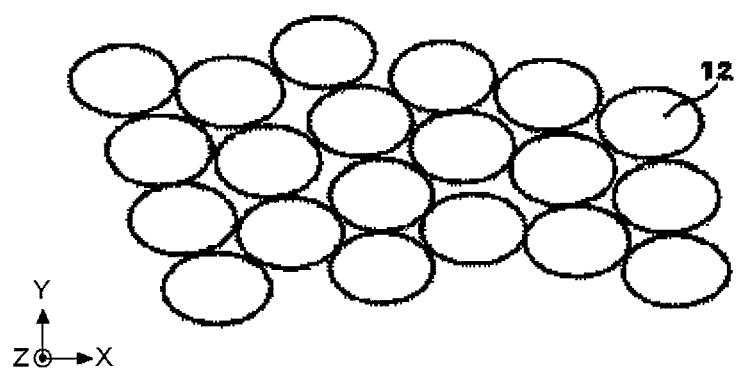
FIG. 11 is a plan view illustrating a second modification of the face protective optical element according to the embodiment of the present invention.

As shown in FIG. 11, a plurality of structures 12 may be randomly arranged in two dimensions on a surface of the optical element 1. At least one of the shape, size, and height of the structures 12 may be changed randomly.

For example, as a method of producing a master used to produce an optical element 1 having the structures 12 described above, a method in which the surfaces of a metal base such as an aluminum base are anodized, but the production method is not particularly limited to this method.

In the second modification, the plurality of structures 12 are randomly arranged in two dimensions, so that the occurrence of unevenness in appearance can be suppressed.

(Third Modification)

Figure 12:
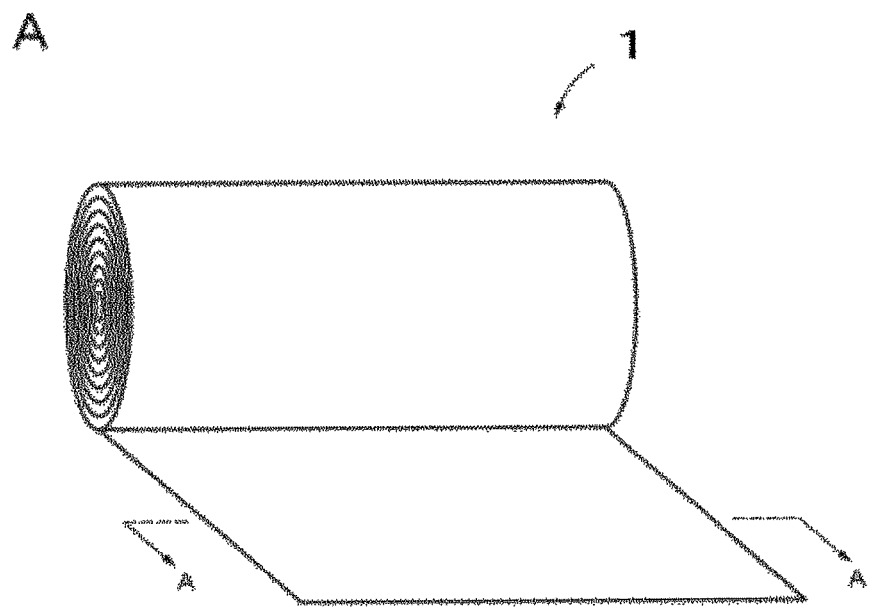
FIG. 12A is an exterior view illustrating a third modification of the face protective optical element according to the embodiment of the present invention.
FIG. 12B is a cross-sectional view taken along ling A-A in FIG. 12A.
Figure 12:
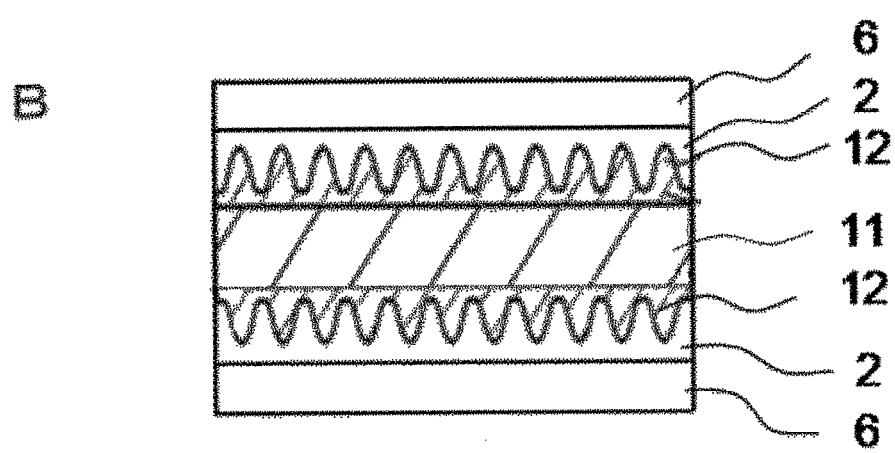

As shown in FIG. 12A, the optical element 1 as a whole may have a strip shape. When such a strip shape is employed, the optical element 1 can be easily produced using a roll-to-roll process. By winding the optical element 1 into a roll of the raw strip, the optical element 1 can be easily handled.

When the above configuration is employed as the configuration of the optical element 1, it is preferable that protective layers 6 for protecting the structures 12 be further provided on the outermost surfaces of the optical element 1 through adhesive layers 2, as shown in FIG. 12B. This is because, even when the optical element 1 is wound into a roll of the raw strip, breakage of the structures 12 can be suppressed and a reduction in the optical adjustment function can be suppressed. The protective layers 6 and the adhesive layers 2 are removed before use of the optical element 1.

EXAMPLES

The present technique will next be described specifically by way of an Example. However, the present technique is not limited only to the Example.

Example 1

First, a few drops of a UV curable resin having hydrophilic groups were dripped onto a master having a moth eye shape. The master was covered with a polyolefin film serving as a transparent substrate, and the UV curable resin was spread over the entire master using a roller. As the UV curable resin having hydrophilic groups, a mixture prepared by mixing urethane acrylate (EBECRYL 9270 manufactured by DAICEL-CYTEC Company, Ltd.) and methoxypolyethylene glycol monomethacrylate (SR550 manufactured by Sartomer) at a weight ratio of 7:3 and adding 3% by weight of a photo-initiator IRGACURE 184 (manufactured by Ciba Specialty Chemicals) was used.

Then the resin was irradiated with ultraviolet rays at 1,000 mJ through the polyolefin film for 1 minute to cure the resin, and the cured resin was released from the master to thereby obtain an optical element. The same procedure was repeated to transfer the moth eye shape from the master to the opposite surface side of the polyolefin film, whereby an optical element having irregular shapes on opposite surfaces was obtained.

Comparative Example 1

First, a few drops of a UV curable resin having no hydrophilic groups were dripped onto a master having a moth eye shape. The master was covered with a polyolefin film serving as a transparent substrate, and the UV curable resin was spread over the entire master using a roller. Then the resin was irradiated with ultraviolet rays through the polyolefin film to cure the resin, and the cured resin was released from the master to thereby obtain an optical element. The same procedure was repeated to transfer the moth eye shape from the master to the opposite surface side of the polyolefin film, whereby an optical element having irregular shapes on opposite surfaces was obtained. Then the irregular surfaces of the produced optical element were subjected to corona treatment as surface treatment. An optical element having irregular surfaces on opposite surfaces and to which hydrophilicity was imparted was thereby obtained.

Comparative Example 2

An optical element having irregular surfaces on opposite surfaces and to which hydrophilicity was imparted was obtained in the same manner as in Comparative Example 1 except that plasma treatment was performed as the surface treatment.

Comparative Example 3

An optical element having irregular surfaces on opposite surfaces and to which hydrophilicity was imparted was obtained in the same manner as in Comparative Example 1 except that UV/ozone treatment was performed as the surface treatment.

Comparative Example 4

An optical element having irregular surfaces on opposite sides was obtained in the same manner as in Comparative Example 1 except that the surface treatment step was omitted.

Comparative Example 5

An optical element having irregular surfaces on opposite surfaces and to which hydrophilicity was imparted was obtained in the same manner as in Comparative Example 1 except that hydrophilization treatment was performed as the surface treatment. The hydrophilization treatment was performed by coating the irregular surfaces of the optical element with a surfactant using a dipping method and then drying the surfactant.

(Evaluation of Transmittance)

The transmittance of each of the optical elements in Example 1 and Comparative Examples 1 to 5 was evaluated using an evaluator (V-550) available from JASCO Corporation. Among the evaluation results, the transmittance at a wavelength of 550 nm is shown in TABLE 1.

(Results)

Almost no difference was found between the transmittance in Example 1 and the transmittance in Comparative Examples 1 to 4. In Comparative Example 5, a reduction in transmittance was found.

(Evaluation of Contact Angle)

The contact angle of pure water on an irregular surface of each of the optical elements in Example 1 and Comparative Examples 1 to 5 was measured. The contact angle was measured twice, one hour after the sample was produced and 12 days after the sample was produced. A treated surface of the sample was used as the measurement surface, and the average of five measurements was used as a measured value. The contact angle was measured using type CA-V manufactured by Kyowa Interface Science Co., Ltd. An optical element in which both the above two measured contact angles were 40° or less was judged as good.

(Results)

In the measurement one hour after the sample was produced, favorable results were obtained in Example 1 and Comparative Examples 1 to 3 and 5. In the measurement 12 days after the sample was produced, favorable results were obtained only in Example 1 and Comparative Example 5.

(Evaluation of Anti-Fogging Properties)

Fogging was evaluated by breathing directly on a film while the film was held at a position spaced about 2.5 cm apart from the mouth. The fogging was evaluated twice, one hour after the sample was produced (initial fogging) and 12 days after the sample was produced. The initial fogging was subjectively measured as "very good," "good," and "poor" according to the relative ability to allow a view through the film after the film was breathed on. The following numerical grades were used for the evaluation after 12 days. "C" means that the coated film is fogged as if it is an uncoated film. "A" means that the coated film is slightly fogged after the film is breathed on three times continuously. "AA" means that the coated film is not fogged even after the film is directly breathed on five times. The results are shown in TABLE 1.

(Results)

In the measurement one hour after the sample was produced, very good and good results were obtained in Example 1 and Comparative Examples 1 to 3 and 5. In the measurement 12 days after the sample was produced, the results were "AA" in Example 1, and the results were "A" in Comparative Example 5.

As can be seen from the above results, only Example 1 showed favorable results for all the transparency, hydrophilicity, and anti-fogging properties.

53 beam expander
54 objective lens
55 spindle motor
56 turntable
57 control mechanism
70 face protector

TABLE 1

| | Structures | | | Evaluation | | | |
| --- | --- | --- | --- | --- | --- | --- | --- |
| | | | | Contact Angle of Water (1 Hour after Each Treatment) | | Evaluation of Anti-Fogging Properties (1 Hour after Each Treatment) | |
| | Resin for Structures | Surface Treatment on Structures | Transmittance | 1 Hour after Each Treatment | 12 Days after Each Treatment | 1 Hour after Each Treatment | 12 Days after Each Treatment |
| Example 1 | Hydrophilic | No Treatment | 99.4% | 40° | 39° | Very Good | AA |
| Comparative Example 1 | Hydrophobic | Corona Treatment | 99.0% | 35° | 90° | Good | C |
| Comparative Example 2 | Hydrophobic | Plasma Treatment | 99.0% | 40° | 95° | Good | C |
| Comparative Example 3 | Hydrophobic | UV/Ozone Treatment | 99.0% | 38° | 92° | Good | C |
| Comparative Example 4 | Hydrophobic | No Treatment | 99.0% | 125° | 124° | Poor | C |
| Comparative Example 5 | Hydrophobic | Hydrophilization Treatment | 98.3% | 30° | 38° | Very Good | A |

The embodiments and Example of the present technique have been specifically described. However, the present technique is not limited to the above embodiments and Example, and various modifications can be made on the basis of the technical idea of the present technique.

For example, the configurations, methods, processes, shapes, materials, numerical values, etc. described in the above embodiments and Example are merely examples, and configurations, methods, processes, shapes, materials, values, etc. different from those described above may be used as needed.

The configurations, methods, processes, shapes, materials, numerical values, etc. in the above embodiments and Example may be mutually combined so long as the combination does not depart from the scope of the present technique.

REFERENCE SIGNS LIST 1 optical element
11 substrate
12 structure
13 base layer
14 protruding portion
15 curved surface portion
31 roll master
32 structure
33 resist layer
34 laser beam
35 latent image
36 transfer material
37 energy ray source
41 laser beam source
42 electro optical modulator
43 mirror
44 photodiode
45 modulation optical system
46 condenser lens
47 acousto-optic modulator
48 lens
49 formatter
50 driver
51 mirror
52 movable optical table 71 face mask
72 string
73 eye shield
74a, 74b joint region
75 concave portion

The invention claimed is:

1. A face protective optical element comprising a flexible transparent substrate having, on opposite surfaces thereof, a plurality of structures disposed at a pitch equal to or less than a wavelength of visible light, wherein
    the structures comprise a cured product of a resin having a hydrophilic functional group, and the optical element has hydrophilic surfaces,
    the optical element has transmittance of light (at a wavelength of 550 nm) of 98.5% or higher,
    the face protective optical element has a concave portion at the center of a lower edge of the face protective optical element,
    Ha:T:Hb=18 to 30:1,000 to 50,000:18 to 30 is satisfied, where Ha is a height of the structures disposed on one the surfaces of the transparent substrate, T is a thickness of the transparent substrate, and Hb is a height of the structures disposed on the other of the surfaces of the transparent substrate,
    a height Ha or Hb of the structures is in a range of from 180 nm to 300 nm, and
    the face protective optical element is configured to:
        cover at least a portion of a user's face,
        be secured or detachably attached to a face mask that covers a nose, mouse, and part of the jaws of the user, and
        have an anti-reflective and anti-fogging performance.

2. The optical element according to claim 1, wherein the structure is formed from a cured product of an ultraviolet curable resin.

3. The optical element according to claim 1, wherein the structure has substantially the same refractive index as that of the transparent substrate.

4. The optical element according to claim 1, wherein the surfaces of the optical element have a contact angle of water of 40 degrees or less.

5. The optical element according to claim 1, wherein the transparent substrate is formed by bonding a plurality of transparent members.

6. A face protector comprising the optical element according to claim 1, the optical element being detachably attached to an attachment jig.

7. A face protector comprising the optical element according to claim 1, the optical element being secured to a face mask.

8. The optical element according to claim 1, wherein a thickness of the substrate is in a range of from 10 μm to 500 μm.

9. The optical element according to claim 1, wherein an aspect ratio of the structures (height H/an arrangement pitch P) is in a range of from 0.66 to 1.96.

* * * * *